Figure 1:
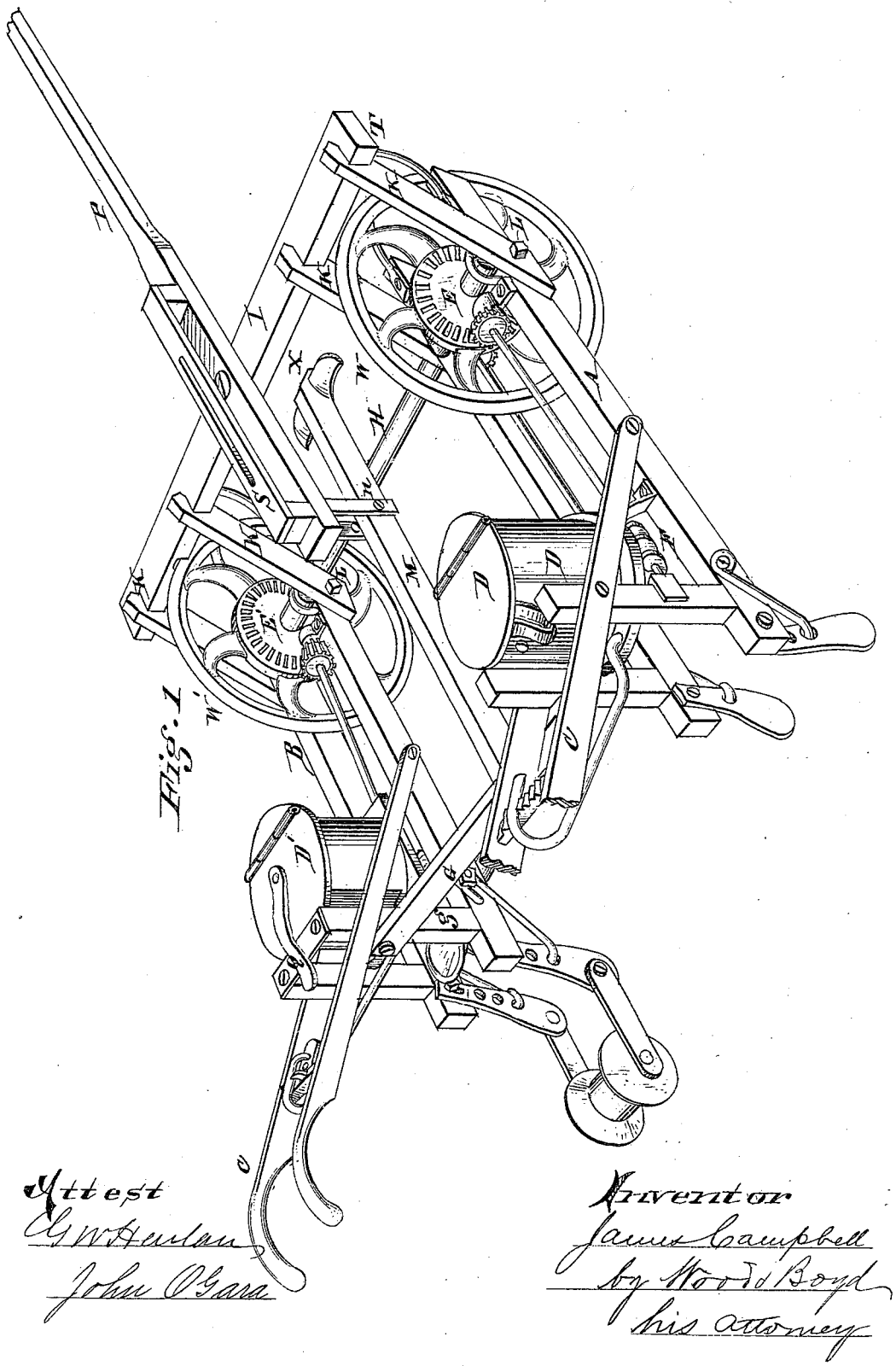

J. CAMPBELL.
Corn-Drills.

No. 165,788.

2 Sheets--Sheet 1.

Patented July 20, 1875.

Attest
G. W. Hurlan
John O'Gara

Inventor
James Campbell
by Wood & Boyd
his attorney

2 Sheets--Sheet 2.
J. CAMPBELL.
Corn-Drills.
No. 165,788.
Patented July 20, 1875.
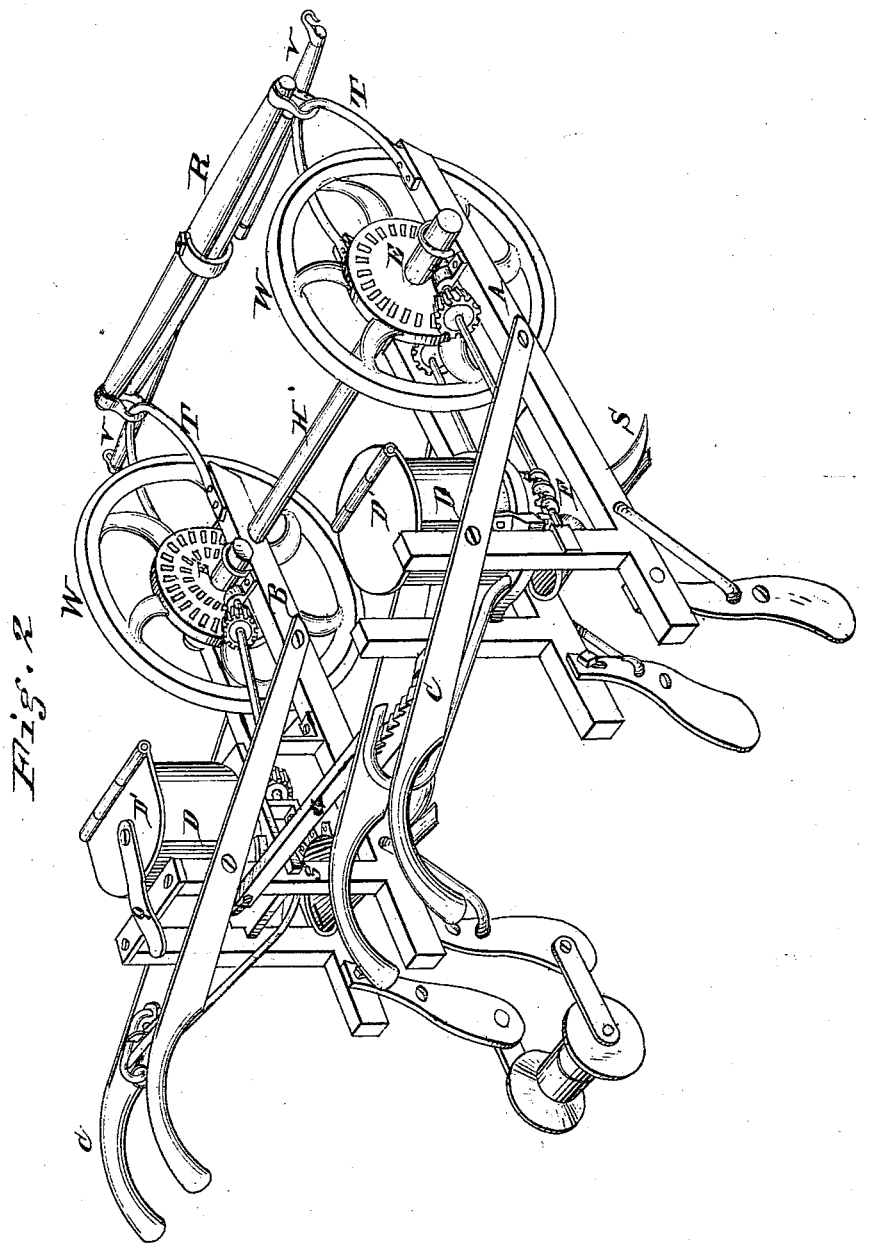
Attest
G W Harlan
John O'Gara
Inventor
James Campbell
by Wood & Boyd
his Attorneys

UNITED STATES PATENT OFFICE.

JAMES CAMPBELL, OF HARRISON, OHIO.

IMPROVEMENT IN CORN-DRILLS.

Specification forming part of Letters Patent No. 165,788, dated July 20, 1875; application filed December 19, 1874.

*To all whom it may concern:*

Be it known that I, JAMES CAMPBELL, of Harrison, in the county of Hamilton and State of Ohio, have invented certain new and useful Improvements in Combined Double Corn-Drills, of which the following is a specification:

My invention relates to an improvement in corn-drills, and to that class in which the distinctive features are, first, a front or pilot driving-wheel; second, a main frame mounted upon and guided by the pilot-wheel; third, a rotating dropper-plate at the bottom of the seed-box, and gearing operating it, connected with and driven by the gearing on the pilot-wheel; and, fourth, a furrow-tooth, attached to the main frame under the seed-box.

The drill is usually guided by the operator, after the manner of holding plows.

My invention consists in the combining of two such drills by means of a yoke and connecting-frame, so as to form a two-horse riding-drill, operated by an attendant riding upon the frame of the double drill.

Figure 1 represents my improved double riding corn-drill. Fig. 2 represents my improved double walking-drill.

W represents a front ground pilot-wheel of ordinary construction; A, the main frame of the planter, which is mounted upon and steered by said wheel. D represents the seed-box; F and E, the gearing for operating the dropping mechanism; C, the handles for guiding the same, when the drill is used as a single or walking planter.

In like manner W', B, D', C', and E represent like parts of a second drill.

It is not necessary to describe the construction and operation of these drills and their several parts, as they are fully described in the reissued Letters Patent originally granted to James and William Campbell, one dated May 8, 1866, and in others of later date.

My invention as here shown relates to the means used to combine two single planters or drills, so as to form a double or two-horse drill. To accomplish this I provide a yoke, G, which, for convenience, is attached to the standard $g$ of the seed-box by a pivot-bolt, the object of which is to keep the two planters a given distance apart, to connect them firmly, at the same time to allow the rear end of each drill to rise and fall independent of the other sufficiently to allow the drills to pass over obstacles while drilling, and to allow either to be raised independent of the other a short distance, at the will of the operator.

It is obvious that this yoke may be attached to different portions of the machine, and different form of joint connections used, and still accomplish the same results.

H represents a coupling-rod, connecting the front ends of the drill-frames. This, however, may be dispensed with. I K K represent a frame removably secured to the frame of the drills at or near the drive-wheels, as shown in Fig. 1.

This frame may be attached either farther forward or back, as desired, the object being to have the frame of the machine nearly balanced by the weight of the operator against the draft of the team.

P represents a tongue secured to the frame I K in any suitable manner. S represents a seat for the operator. M represents a reach or tilting-rod, the rear end of which is fastened into yoke G, and the front pivoted to the tongue by means of the bracket $n$. $x$ represents a step for the driver's feet to rest upon. By pressing his weight upon step $x$ he is enabled to lift the rear end of the drill out of the ground.

It is obvious that the reach M may be pivoted to the connecting-rod H, which may be set forth, back, or in any other convenient manner, to secure proper leverage for raising the furrow-teeth.

The double-trees may be attached directly to the bails Y, as shown in Fig. 2, or to the standards I and guy-rods or stay-chain used to connect the double-trees with each drill, if desired.

Fig. 2 represents a double walking-planter, the two drills being kept a sufficient distance apart by means of the yoke G and coupling-rod H, the latter to allow the rear end of either frame to rise independently a distance of a foot or more, and should act as a roller.

It is obvious that the double-trees R and the bails Y Y' could perform the office of lateral-connection brace, and also form a joint for the independent movement of the drills without the use of the roller H; but the combination would be less durable. So, instead of attaching the double-tree to bails Y Y', the connection may be made to coupling-roller H, the bails or other means being used to simply sustain the weight of the double and single trees; but this mode of attachment would be inferior to the one shown in the drawings.

Having described my improvement, what I claim as my invention, and desire to secure by Letters Patent, is—

1. A double riding corn-drill, composed substantially of two pilot-wheel corn-drills, connected by means of the yoke G and frame I K, substantially as herein set forth.

2. In a double or riding corn-drill, the yoke G, tilting-bar M, and frame I K, constructed and combined substantially as herein set forth.

3. The combination of the two single pilot-wheel corn-drills by means of the riding-frame I K, yoke G, and roller H, substantially as herein set forth.

4. The combination of the loose yoke G and roller H with the two single pilot-wheel corn-drills, substantially as described.

In testimony whereof I have hereunto set my hand this 11th day of December, 1874.

JAMES CAMPBELL.

Witnesses:
E. E. WOOD,
JOHN O'GARA.